United States Patent
Hennebert

(10) Patent No.: US 11,093,643 B2
(45) Date of Patent: Aug. 17, 2021

(54) METHOD AND SYSTEM FOR ACCESSING ANONYMIZED DATA

(71) Applicant: COMMISSARIAT A L'ENERGIE ATOMIQUE ET AUX ENERGIES ALTERNATIVES, Paris (FR)

(72) Inventor: Christine Hennebert, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 331 days.

(21) Appl. No.: 16/363,546

(22) Filed: Mar. 25, 2019

(65) Prior Publication Data
US 2019/0294822 A1 Sep. 26, 2019

(30) Foreign Application Priority Data
Mar. 26, 2018 (FR) ...................... 18 52591

(51) Int. Cl.
*H04L 29/06* (2006.01)
*G06F 21/62* (2013.01)
(Continued)

(52) U.S. Cl.
CPC ...... *G06F 21/6254* (2013.01); *G06F 16/2379* (2019.01); *G06F 21/602* (2013.01); *H04L 9/0637* (2013.01); *H04L 9/30* (2013.01); *H04L 9/3213* (2013.01); *G06F 21/335* (2013.01); *H04L 2209/38* (2013.01)

(58) Field of Classification Search
CPC ............ G06F 21/6254; G06F 16/2379; G06F 21/602; H04L 9/0637; H04L 9/30; H04L 9/3213; H04L 2209/38
See application file for complete search history.

(56) References Cited

U.S. PATENT DOCUMENTS 10,755,327 B2 * 8/2020 Nagla .................. H04L 9/3247
2011/0010563 A1 1/2011 Lee et al.
(Continued)

FOREIGN PATENT DOCUMENTS

WO WO 2018/019364 A1 2/2018

OTHER PUBLICATIONS

Maesa, Damiano Di Francesco, Paolo Mori, and Laura Ricci. "Blockchain based access control." IFIP international conference on distributed applications and interoperable systems. Springer, Cham, 2017 (Year: 2017).*

(Continued)

*Primary Examiner* — Shawnchoy Rahman
(74) *Attorney, Agent, or Firm* — Oblon, McClelland, Maier & Neustadt, L.L.P.

(57) ABSTRACT

A method for anonymized storage of personal data and a method for managing access to the data. The anonymization of data is achieved by making independent, thanks to the use of a blockchain, the identifiers of the data sources and the users on the one hand, and the personal data on the other hand. The personal data are stored at addresses indexed by their hashed values in a first database and the identifiers are stored with their corresponding access profiles in a second database. The link between these two independent databases is ensured by cryptographic elements recorded in the ledger of the blockchain.

10 Claims, 8 Drawing Sheets

(51) Int. Cl.
  *G06F 16/23*    (2019.01)
  *G06F 21/60*    (2013.01)
  *H04L 9/06*     (2006.01)
  *H04L 9/30*     (2006.01)
  *H04L 9/32*     (2006.01)
  *G06F 21/33*    (2013.01)

(56) References Cited

U.S. PATENT DOCUMENTS

| | | | |
|---|---|---|---|
| 2018/0060496 A1 | 3/2018 | Bulleit et al. | |
| 2019/0279173 A1* | 9/2019 | Marchetto | G06Q 20/0855 |
| 2020/0036519 A1* | 1/2020 | Bitauld | H04L 9/3263 |
| 2021/0014065 A1* | 1/2021 | Gourisetti | G06F 16/27 |

OTHER PUBLICATIONS

Bui, Thanh, and Tuomas Aura. "Application of public ledgers to revocation in distributed access control." International Conference on Information and Communications Security. Springer, Cham, 2018 (Year: 2018).*

French Preliminary Search Report dated Jan. 8, 2019 in French Application 18 52591 filed on Mar. 26, 2018 (with English translation of categories of cited documents).

Zyskind, G., et al. "Decentralizing Privacy: Using Blockchain to Protect Personal Data", 2015 IEEE CS Security and Privacy Workshops, IEEE Computer Society, 2015, 5 pages.

* cited by examiner

METHOD AND SYSTEM FOR ACCESSING ANONYMIZED DATA

TECHNICAL FIELD

The present invention relates, generally speaking, to a method for accessing personal data, such as data coming from connected objects. It also relates to the field of blockchains and more specifically those that make it possible to execute smart contracts.

PRIOR ART

The General Data Protection Regulation (GDPR) 2016/679 should come into force in May 2018. This regulation notably requires (art. 25) that technical measures are taken as of the design of an information system to guarantee the protection of personal data and the restriction of their access depending on the specific purpose of each processing.

In particular, it is necessary to protect access to data which could reveal the behaviour or the lifestyle of a given user. Thus, for example, the data collected by a network of sensors intended to measure the electrical consumption and/or water consumption of a user of an IoT (Internet of Things) system could give away the times he is present in his home and make said home more vulnerable to intrusions.

Two methods may be used to protect personal data and respect the privacy of users:
  the anonymization of data, that is to say the fact of storing and, if needs be, processing the personal data without possibility of identifying directly or indirectly the person to whom these data belong;
  the confidentiality of data, realised by encryption of personal data by means of an encryption key.

The protection of personal data may thereby be obtained either by concealing the identity of the owners of the data or by concealing the data that belong to them, or instead by combining both techniques in question.

Anonymization has mainly been used for the transport of data. Thus, for example, the fact of masking or substituting the information situated in the headers of messages ("metadata") serving for the routing of frames in a VPN network, makes the determination of the identity of the emitter and the recipient of these frames impossible.

Confidentiality by data encryption is the most widespread method in the field of IoT systems. The data coming from the sensors are then encrypted by means of a symmetric cryptography algorithm, the symmetric keys being distributed beforehand by means of an asymmetric key infrastructure. The user having access rights can access the personal data thereby encrypted and decrypt them with the corresponding symmetric key.

The article of G. Zyskind et al. entitled "Decentralizing privacy: using blockchain to protect personal data", published in Security and Privacy Workshop (SPW), pp. 180-184, May 2015, proposes decentralising the protection of personal data using a blockchain. The access management calls on, on the one hand, an access control transaction storing the identity of the user and his access authorizations in the blockchain and, on the other hand, a transaction of data storing the data encrypted in a distributed manner in the nodes of the network by means of distributed hash table (DHT). This solution, although no longer requiring a centralised trusted third party, is based on a confidentiality of data by encryption.

The aim of the present invention is to propose a method and a system for accessing personal data that makes it possible to protect these data by simple anonymization and do not require resorting to a trusted third party. The aim of the present invention also relates to a method for storing personal data in an anonymized manner.

DESCRIPTION OF THE INVENTION

The present invention is defined by a method for anonymized storage of personal data, said personal data belonging to an owner of data and being supplied by a data generating device, said personal data being intended to be stored in a first database hosted by a data server, the data generating device being connected to the data server by means of a first secure channel, the data generating device and the data server being interfaced with a blockchain, said method including the following steps:
  the data generator generates fingerprints of said data by means of a hash function and records said fingerprints in the blockchain by calling a first smart contract (#Print) deployed in this chain, said fingerprints being recorded in the blockchain in relation with the access parameters;
  the data generator transmits said fingerprints and associated data to the data server via the first secure channel;
  the data server consults the blockchain to read therein the recorded fingerprints, a datum being stored in the first database at an address indexed by its fingerprint if this fingerprint is recorded in the blockchain, and not being stored in the first database if this fingerprint is not recorded in the blockchain.

According to an alternative, the data are stored unencrypted in the first database.

In one embodiment, the data generating device is an edge device of a network of sensors, the edge device collecting raw data coming from these sensors via a gateway.

Said data are advantageously collected in the form of frames, each frame associated with a sensor comprising a header containing the identifier of the sensor and a payload containing the raw data of the sensor, the fingerprint of the raw data being stored in the blockchain in relation with said identifier of the sensor.

Advantageously, the following steps are provided:
  (a) an access token server generates access tokens for different users, an access token of a user representing the access rights of this user to the personal data for a predetermined use, the access token of said user being identified by a token identifier and transmitted, by means of a second transaction, to a second smart contract (#Subscribe) stored in the blockchain, the second smart contract recording the access token in the blockchain;
  (b) a terminal of said user transmits, by means of a third transaction, an access authorization request identified by an authorization request identifier, to a third smart contract (#Authorize) stored in the blockchain, the third smart contract interrogating the first smart contract and obtaining the access token by supplying to it cryptographic elements making it possible to authenticate the user, then determining if the access conditions contained in the token are indeed met and, in the affirmative, recording the access authorization in the blockchain;
  (c) the terminal of said user transmits an access request to the data server, the access request including said access authorization request identifier, the data server interrogating the third smart contract by supplying to it said access authorization request identifier, the third smart contract returning to the data server the token corresponding to this request if an access authorization corresponding to the authorization request identifier is indeed recorded in the blockchain;

(d) the data server reads in the blockchain the fingerprints corresponding to the access parameters specified in the access token obtained at step (c), reads the personal data stored in the first database at the addresses indexed by the fingerprints thereby read, and transmits the personal data thereby read to the terminal of said user.

Said access parameters typically include the identifier of a sensor.

The cryptographic elements typically include a public key of the user and a wallet address obtained by hashing of said public key.

According to an advantageous alternative embodiment, prior to step (b), the token identifier is transmitted to the terminal of the user.

Moreover, at step (b) the access authorization request may be recorded in the blockchain.

Finally, the access token preferably includes a first field containing the token identifier, a second field containing an identifier of the user, a third optional field containing an identifier of the owner of the personal data, a fourth optional field containing the address of the first contract, and a fifth field containing the access parameters.

BRIEF DESCRIPTION OF THE DRAWINGS

Other characteristics and advantages of the invention will become clear from reading a preferential embodiment of the invention, with reference to the appended figures, among which.

DETAILED DESCRIPTION OF PARTICULAR EMBODIMENTS

A first basic idea behind the invention is to record personal data in a database in an anonymized manner, at addresses indexed by their associated fingerprints.

Personal data is taken to mean any information relating to a natural person directly or indirectly identified or identifiable. These personal data may notably come from connected devices (sensors of an IoT network) situated in the environment of the natural person (home for example). To guarantee the privacy of natural persons and notably users of an IoT network, it is necessary to protect access to these personal data. In other words, it must not be possible for a third party to be able to have access to these personal data without having obtained beforehand the authorization of the corresponding natural person. This natural person will be designated hereafter the owner of the personal data.

A second basic idea behind the present invention is to use an information system without central security server. The traditional role of the security server is here devolved to smart contracts executed from a blockchain/a distributed ledger made secure by an automated trust protocol.

It may be recalled that a blockchain is composed of blocks chained by a cryptographic mechanism at regular time intervals. The chaining is obtained by inserting a hash value of the preceding block, obtained by a hash function (such as SHA-256 for example), in the content of the current block. The blockchain forms a ledger that is distributed and replicated to all the nodes of the network. These can interact with the blockchain and use its content. The integrity of the information included in the blocks of the chain is guaranteed by cryptographic functions.

A blockchain capable of storing not only transactions (as in Bitcoin) but also executing the code of smart contracts will be considered hereafter. An example of such a blockchain is Ethereum. A smart contract is a software code that can be stored in a block of the distributed ledger. This software code can be addressed by a determined address and may include several functions. The execution of a function of the smart contract or the contract itself may be triggered by sending a transaction emitted from a wallet address (still called account address in Ethereum) to the address of the code in question, the transaction including the identification of the function to execute and the expected input arguments.

Figure 1:
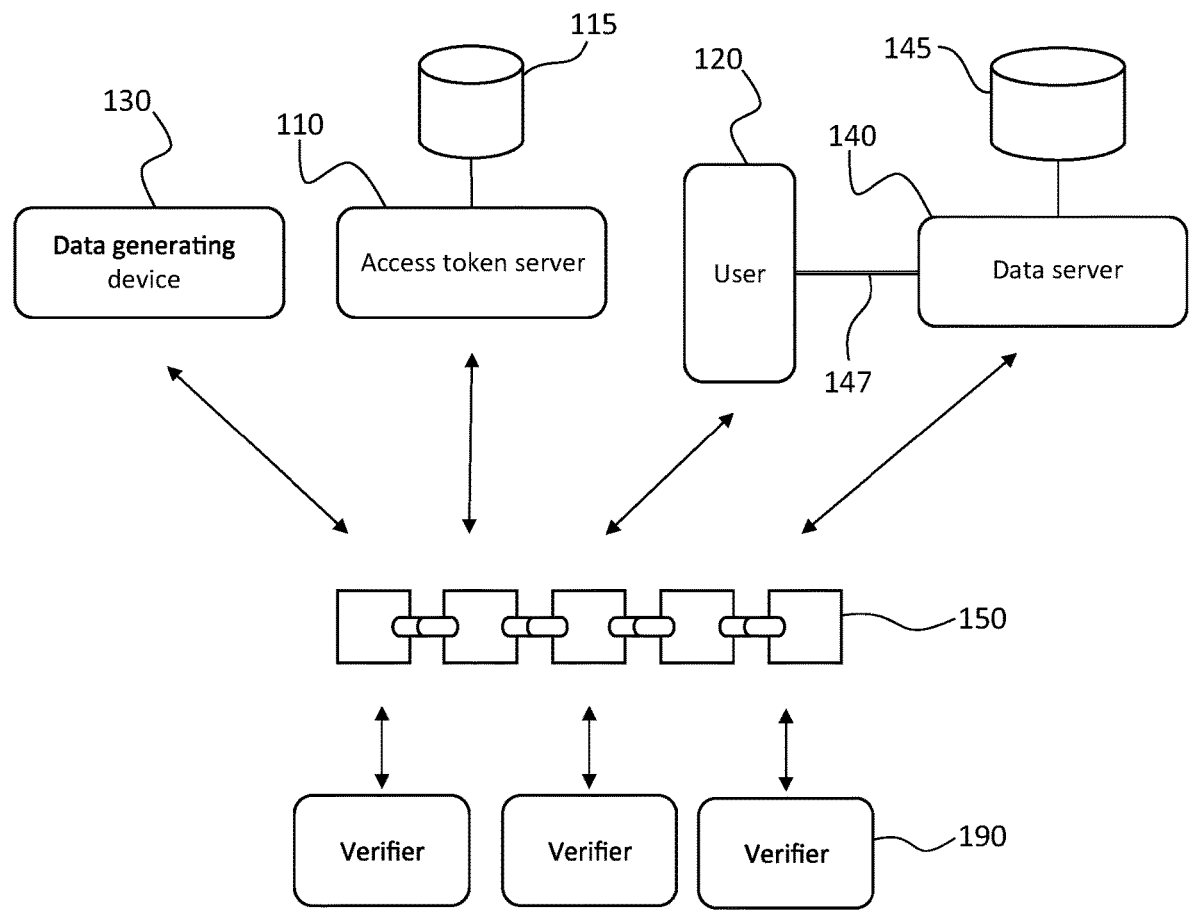
FIG. 1 schematically represents an information system without centralised trusted third party, to which the method for anonymizing personal data according to the invention is capable of applying.

FIG. 1 schematically represents an information system without centralised trusted third party, to which the method for anonymizing personal data according to the invention is capable of applying.

The personal data are generated by a data generating device 130, for example an edge device of an IoT network collecting the data of sensors or instead a terminal capable of supplying data that are input by means of a GUI type interface. The data are structured in the form of frames (or files). The data generator 130 is also suited to calculating fingerprints of these frames (or these files) by means of a hash function.

In 120 is represented the terminal (for example a smartphone, a tablet or a computer) of a user wishing to access personal data. This user may be a normal person or instead an automaton in the form of software hosted in the terminal in question. These personal data may be those of the user himself or, more often, those of a third party that has authorized access thereto. As will be seen hereafter, the personal data are stored in an anonymized manner in a first database 145 hosted by the data server 140. The terminal of the user 120 can communicate with the data server 140 by means of a secure link 147.

The information system further includes an access rights generating device, 110, being in the form of an access token server connected to a second database 115 in which are stored the access profiles of the different users. The access rights generating device is charged with the generation of access tokens to users having an access profile in the second database. Each access token generated for a user contains the access rights of this user, in compliance with the corresponding access profile. The access rights generating device is further charged with updating the access profiles of the different users, in particular their creation, their modification or their deletion.

If needs be, the system may also involve the owner of the personal data, in such a way that he can express his consent (or his refusal to consent), when the access profile of a user requires collecting the consent of the owner of the data.

Once the access token has been generated and, if needs be, the consent of the owner of the data has been obtained, the user can be granted an access authorization to the personal data. The user could next take advantage of this authorization with the data server to actually access the personal data in question.

The different elements of the system, namely the access token server, 110, the terminal of the user, 120, the data generating device, 130 and the data server, 140, have an interface enabling them to interact with the blockchain 150. Each element has at least one wallet, identified by a wallet address. This wallet address is generally obtained by hashing of the public key of a public key/private key pair belonging to this element. The public key/private key pair is derived from an asymmetric cryptography system, such as an elliptic curve cryptography system.

As will be seen hereafter, the operations carried out by the different elements of the system call on smart contracts (or even a single smart contract grouping together all of their respective functions). These smart contracts are stored in the distributed ledger of the blockchain.

The blockchain makes it possible to guarantee the correct execution of security functions and notably the authentication of the different elements of the system. It further makes it possible to control the generation of data fingerprints, the allocation of access rights to users and the delivery of access authorizations in their favour.

The verification of the correct execution of these smart contracts is entrusted to verification nodes 190 of the network that validate the result of their execution according to a consensus mechanism, for example by means of a proof of work, a proof of stake, a proof of authority or even any other type of proof ensuring trust between the distributed elements of the network if the blockchain is private.

Figure 2:
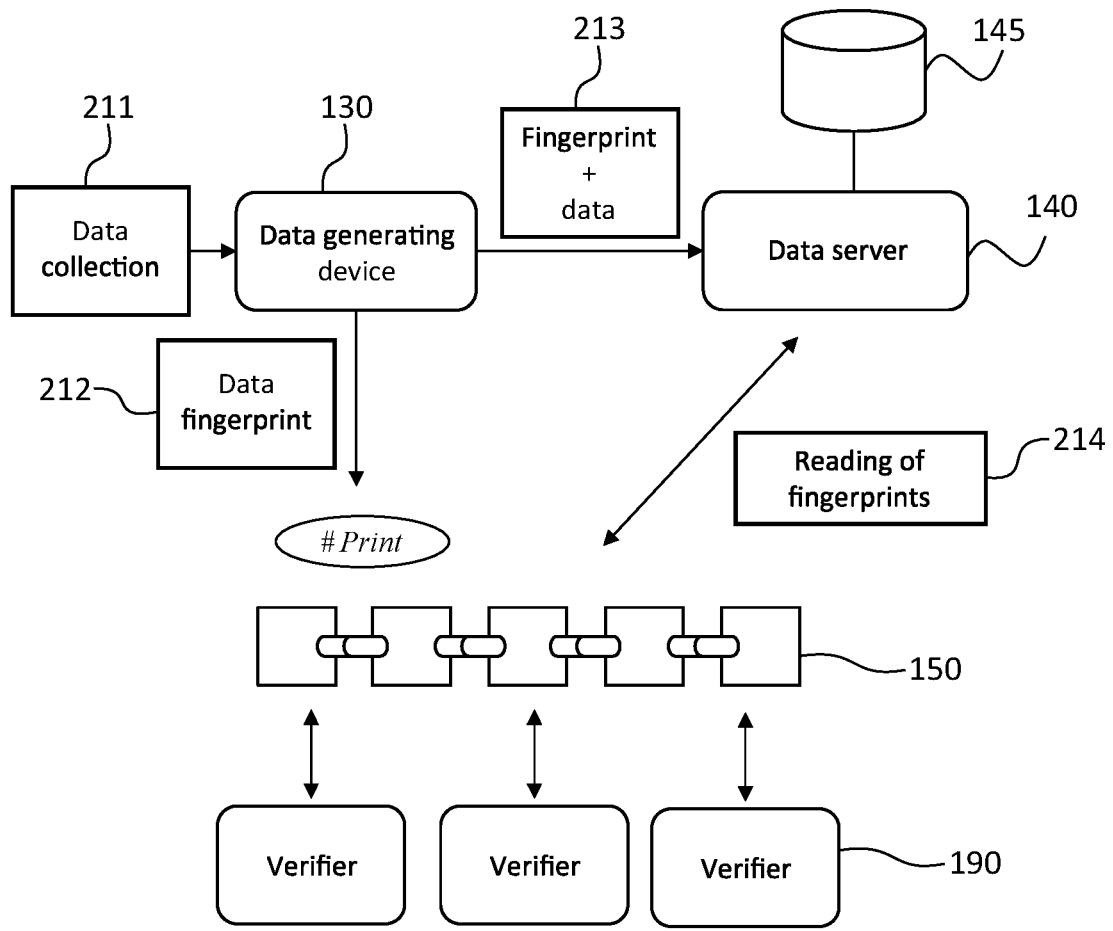
FIG. 2 schematically represents a method for anonymizing personal data for an information system without centralised trusted third party, according to an embodiment of the invention.

FIG. 2 schematically represents a method for anonymizing personal data for an information system without centralised trusted third party, according to an embodiment of the invention.

For the sake of simplification, only certain elements of the information system have been represented. The method for anonymizing data comprises several steps detailed hereafter.

In a first step 211, the personal data are collected and the fingerprints of these data are calculated by the data generating device 130. A data fingerprint is obtained, by hashing of the payload of the frame, after elimination of the header. Indeed, the header of a frame generally contains information making it possible to work back to the identity of the owner of the data, such as an identifier of the data source. The hashing is carried out by a hash function belonging for example to the SHA-2 or SHA-3 family with a fingerprint size that can typically range from 256 to 1024 bits. The fingerprint thereby calculated represents a condensate of the raw data contained in the payload of the frame in question.

In a second step 212, the data fingerprints are recorded in the blockchain, 150. The recording is carried out using a first smart contract (#Print), after it has authenticated the data generator. The execution of this contract is launched by a transaction sent from the wallet of the data generating device.

This first transaction has for arguments the identifier of the data generating device (the wallet address of the edge device), the fingerprint (of the data frame or data file) to record, the access parameters and, if needs be, the location for example in the form of a URL of the resource where the data are stored (this argument could be omitted when the system only includes a single first database). The access parameters may for example contain the identifier of the sensor from which the data have come.

If needs be, the first transaction includes the payment of a price in cryptocurrency to a wallet address of a third party, for example the enterprise having deployed the sensors or instead that of an administrator.

In a third step, 213, the collected data frames and their respective fingerprints are transmitted, via a secure channel, to the data server, to be stored in the first database, at the location indicated (URL for example).

Before storing a data frame, the data server consults in 214 the distributed ledger to verify if the corresponding fingerprint is indeed present in the blockchain. If this fingerprint is not present, the corresponding data frame is not stored. If on the other hand it is actually present, the data frame is stored in the first database at an address indexed by its fingerprint. It will consequently be understood that the data are recorded in an anonymized manner in the first database.

Figure 3:
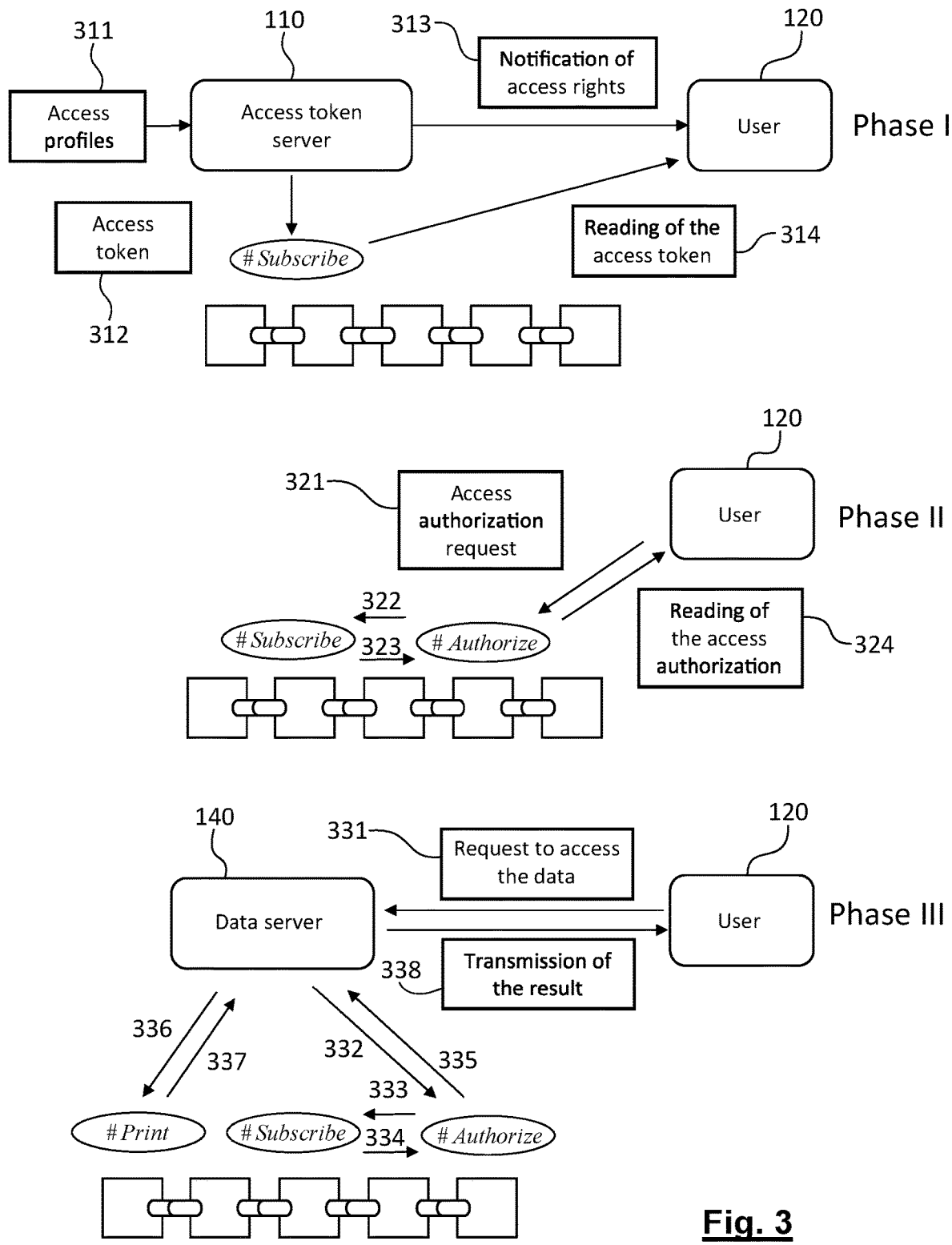
FIG. 3 schematically represents the main steps of a method for accessing personal data anonymized by the method of FIG. 1.

FIG. 3 schematically represents the main steps of a method for accessing personal data, anonymized beforehand by means of the method of FIG. 2.

This access method essentially comprises three phases. Only certain elements of the information system have been represented in the different phases.

The first phase (phase I) relates to the generation of the access rights of the different users and their recording in the blockchain.

The access token server 110 generates tokens representing the access rights of the different users to the personal data. A token is relative to a user for a predetermined use. It is defined by a structured set of data including several fields and must comply with the access profile specified in the first database.

The structure of an access token is detailed hereafter.

A first field contains a token identifier (for example a randomly drawn number), TokUID.

A second field contains the identifier of the user (or the automaton, or even the connected object), owner of the token. This identifier is as a general rule the wallet address of the user. However, when different users are capable of having the same wallet address (case of Ethereum where the wallet address only includes 180 bits of the fingerprint (hash of 256 bits obtained by SHA-256) of the public key obtained), this second field could also include the public key of the user.

A third field contains the identifier of the owner of the personal data. This third field is optional and could be omitted when the owner of the personal data can be deduced in an univocal manner from the identifier of the user. As previously, in the event of possible collision between wallet addresses, the third field could also include the public key of the owner of the data.

A fourth field includes the address of the contract #Print (or even also the contract #Authorize which will be discussed hereafter). This field is optional in so far as the data server could receive these addresses outside of the blockchain.

A fifth field includes the access parameters: an identifier of the data source, an identifier of the access policy and of the use case authorized under this access policy. This set of parameters characterises the authorized access.

A sixth field, optional, gives the expiry date of the token. If needs be, this field could also indicate if the token has been revoked (Boolean variable).

A seventh field, optional, indicates if the owner of the data has given his consent for the use for which the token is intended (Boolean variable).

An eighth field, optional, indicates if the potential amount associated with the use of the token has indeed been paid.

The order of the different fields may obviously differ from one implementation to the other. Other fields could also be envisaged by those skilled in the art without going beyond the scope of the present invention.

The access token server has a wallet address (still called account address in Ethereum) @walletTokserver from which it can emit transactions to the blockchain. This wallet address is obtained by hashing of its public key by means of a hash function (such as SHA-256 for example).

At step 311, the access token server receives the access profiles of the users for the different envisaged uses.

At step 312, the access token server transmits a second transaction destined for a second smart contract (#Subscribe), stored in the blockchain at a predetermined account address. This transaction has for argument an access token in the aforesaid format for the use case in question.

The access rights server calls upon a particular function of the contract #Subscribe which contains a locking script (scriptLockPolicy#n where n indexes the use case) associated with the considered use case. This locking script records the token in the distributed ledger of the blockchain.

If needs be, the second transaction includes the payment of a price in cryptocurrency to the owner of the personal data.

Moreover, the owner of the personal data may be induced to provide his consent to the consultation of the personal data, either outside of the blockchain (for example by means of a mandate contract signed by the parties), or through the blockchain. The consent granted to a user is generally linked to a particular access profile. When the consent has to be collected through the blockchain, this consent is inscribed in the blockchain by means of a smart contract #Consent (not represented).

The access token server 110 next notifies in 313 (notification outside of the blockchain) the user that a token in his favour has been created and stored in the blockchain and communicates to him the identifier of the token thereby created, TokUID.

The user is then able to consult the distributed ledger of the blockchain in 314 to read therein, from its wallet address (@walletUser), the token thereby stored.

The correct execution of the smart contracts #Subscribe and #Consent, the recording of the token and, if needs be, the consent of the owner of the personal data, are verified and validated by the verification nodes, 190, on the basis of the aforesaid consensus mechanism.

The second phase (Phase II) relates to the emission by the user of an access authorization request to the personal data and the authorization that is granted to him in return, if needs be.

The user wishing to obtain an access authorization to the personal data of the owner emits, in a first step 321, a transaction (hereafter designated third transaction), from the wallet address @walletUser and destined for a third smart contract (#Authorize) stored in the blockchain. This transaction is identified by an access authorization request identifier in the form of an order number, IdReq#p, generated by the user.

The third transaction has for argument the public key of the user (PublicKey), the access authorization request identifier (IdReq#p), and a digital signature of the transaction (SigNum) by means of the private key of the user. Digital signature is taken to mean a cryptographic element making it possible to verify that the author of the transaction is indeed that identified by the public key. As an example, when the blockchain is Ethereum, the digital signature may be supplied by the sign function of the "util" library of Ethereum.

The third transaction calls upon a particular function of the smart contract #Authorize, playing the role of unlocking script (scriptUnlockPolicy#n where n indexes the use case) corresponding to the locking script of the contract, #Subscribe.

The unlocking script calls in 322 the first smart contract, #Subscribe, by supplying to it in argument the identifier of the token, TokUID. Using this identifier, the smart contract #Subscribe finds the token and transmits it in 323 to the smart contract #Authorize. The unlocking script uses the cryptographic elements supplied by the user, namely the public address of the user, PublicKey, and the digital signature of the transaction, SigNum, to unlock the token. If the cryptographic elements indeed correspond to those indicated in the locking script, the token is unlocked and, if it is still valid, an access authorization (AuthZ) is stored in the blockchain with the access authorization request identifier (IdReq#p). This access authorization contains the identifier of the token for which it has been granted.

On the other hand, if the cryptographic elements do not correspond to those expected or if the token is out of date, no access authorization is stored in the distributed ledger of the blockchain.

If needs be, the third transaction will comprise the payment of an amount in cryptocurrency to remunerate the access service and/or the owner of the personal data. The payment of the price could constitute a condition to meet to obtain the authorization. The payment could be made by the user by means of the third transaction.

The access authorization includes if needs be the validity parameters of this authorization: period of validity, maximum number of consultations, etc.

The user is then able to consult the distributed ledger and read the authorization granted and under what conditions, in 324.

Here again, the correct execution of the smart contracts #Authorize and #Subscribe, the unlocking of the token, the conditions of use, the payment of the required price, the recording of the access authorization are verified and validated by the verification nodes, 190, on the basis of the aforesaid consensus mechanism.

The third phase (Phase III) relates to the actual access to the personal data.

The user transmits in 331, by means of his terminal 120, a request to access the personal data, destined for the data server, 110, via the secure channel, 147. This request includes the access authorization request identifier, IdReq#p.

The data server then interrogates the second smart contract #Authorize by providing to it the access authorization request identifier, IdReq#p in 332. The contract #Authorize verifies that an access authorization corresponding to the number has indeed been granted to the user and, in the affirmative, interrogates in 333 the first smart contract #Subscribe and obtains in 334 the corresponding token (that is to say the token of which the identifier TokUID appears in the access authorization). The contract #Authorize returns, in 335, the token in question to the data server.

The data server extracts from the token the access parameters and notably the identifier of the data source. It interrogates in 336 the contract #Print and recovers in return in 337 the fingerprints of data from this source and the URL where these data are stored.

At the URL thereby obtained, the data server reads the personal data that are stored therein at the addresses indexed by the fingerprints.

The data in the database may be stored in encrypted or unencrypted form. When they are encrypted, the encryption keys may be stored in a digital vault (or "secure element"). The access server can access the secure element and read the appropriate encryption key to decrypt the data at the address specified by the fingerprint.

If needs be, if several fingerprints are specified, the personal data read may be aggregated by the data server, prior to their transmission. Generally speaking, the server may carry out a processing of the data thereby read before transmitting them to the user.

At step 338, the data server transmits to the user, via the secure channel, the extracted personal data, after having aggregated them if necessary.

Figure 4:
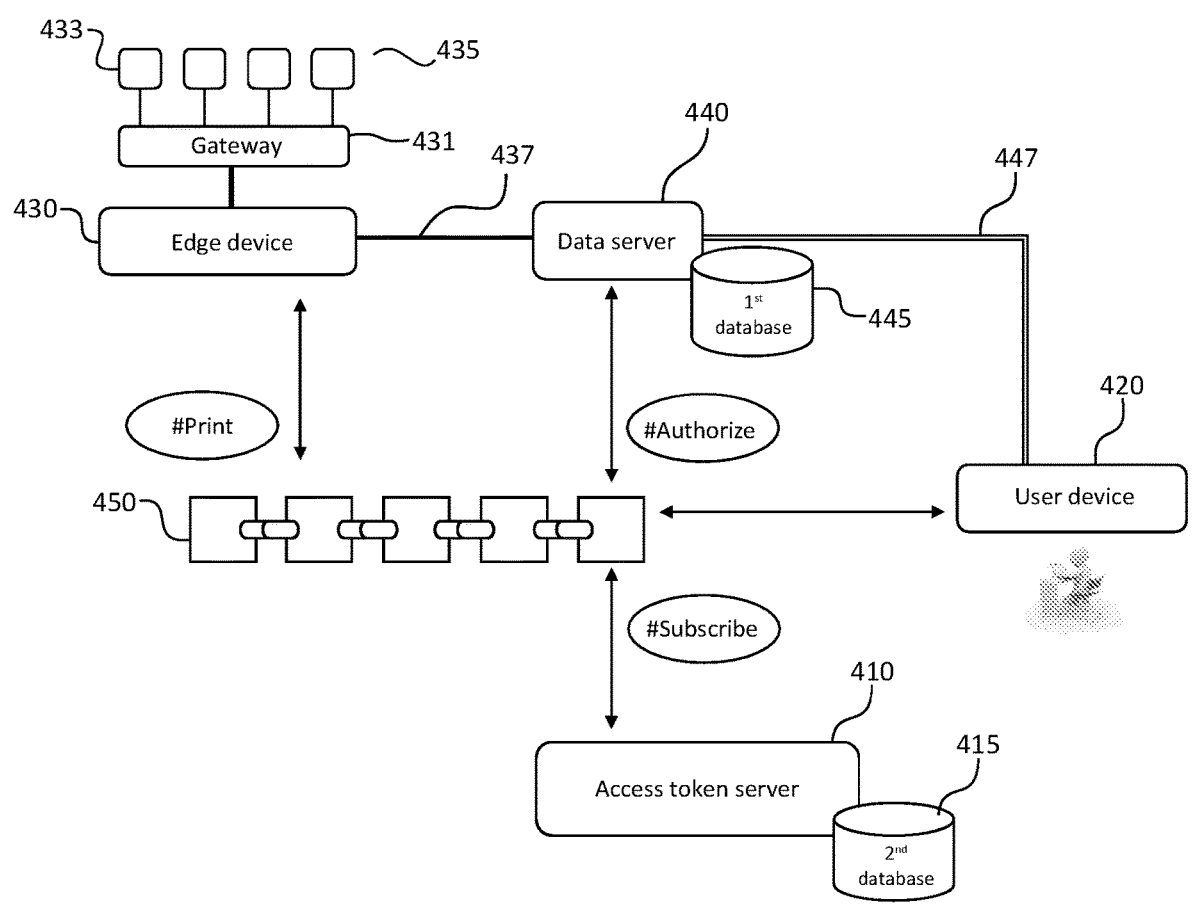
FIG. 4 schematically represents the architecture of a first information system implementing the method for anonymizing personal data according to FIG. 2 and the method for accessing these data according to FIG. 3.

FIG. 4 schematically represents the architecture of a first information system implementing the method for anonymizing personal data according to FIG. 1 and the method for accessing these data according to FIG. 3

In this information system, the personal data are supplied by connected objects. As an illustration, the connected objects considered here may be electricity or water consumption sensors in apartments, geolocation sensors, etc.

The connected objects, 433, are connected to an edge device, 430, via a gateway, 431.

Objects may form a local network, 435, according to different topologies (star or mesh for example) by communicating via a wireless protocol (WiFi, Bluetooth, BLE, ZigBee, 6LoWPAN, LoRaWAN, SigFox, X3D, EnOcean, etc.) or a wired protocol (Ethernet or KNX for example). These objects may have embedded sensors. They may also be constrained in resources, remote and autonomous.

The function of the gateway 431 is to ensure the interface between the network of connected objects and the edge device 430.

The edge device, 430, here plays the role of a data generator. It transmits data generated via a first secure channel (typically by a SSH or SSL/TLS protocol), 437, to the data server 440. The edge device 430 is equipped with a blockchain (BKC) interface making it possible to transmit the data fingerprints to the blockchain to be recorded therein using the smart contract "#Print".

If needs be, the edge device 430 may be integrated in the gateway 431.

The data server 440 hosts the first database 445 in which the personal data are stored in an anonymized manner. Each data frame or data set is stored in a resource pointed by a URL, at an address indexed by its fingerprint. The data server is also equipped with an interface with the blockchain enabling it to consult the distributed ledger and notably to read the access authorizations of the users.

The user terminal, 420 (in practice a client application hosted in this terminal, a smartphone for example), or even an automaton, can connect to the data server 440 via a secure channel 447, to transmit to it access authorization requests as explained in phase II of FIG. 3.

It can read its access tokens via the smart contract "#Subscribe" and transmit an access authorization request to the smart contract "#Authorize".

The access token server, 410, hosts the "profile" files of the users and the data sources, 410. The access rights are granted by the access token server, 415, if needs be after having collected the consent of the owners of the data. It should be noted that the owners of the data may also be users in the previous sense.

The access token server can communicate with the blockchain and record the access tokens representing the access rights by calling on the recording function of the smart contract "#Subscribe".

Conventionally, blocks of the blockchain are validated by means of a consensus protocol distributed and mined by mining nodes on the basis of a proof of work or even a proof of authority for private blockchains. The validation of the blocks makes it possible to guarantee the legitimacy, the integrity and the immutability of the information recorded in the distributed ledger.

Each node of the network having a copy of the blockchain (full node) can execute the smart contracts. The verification of the correct execution of a smart contract is incumbent on the mining nodes or a set of verification nodes (for example by means of the TrueBit protocol described in the article of J. Teutsch and C. Reitwießner entitled "A scalable verification solution for blockchains"), the decision of correct execution being taken by consensus.

Advantageously, the execution of the smart contracts will require the spending of an amount in cryptocurrency (sum in gas on Ethereum), in other words the transactions calling upon these contracts could provide a payment in cryptocurrency, which will make it possible to deter denial of service attacks.

Similarly, the verification of the correct execution of the contracts could be remunerated in cryptocurrency.

The distributed ledger storing the blockchain makes it possible to manage the identifiers of the different players of the system (the data generating device, the data server, the access token server, the users) and to ensure the link between them without breach of confidentiality. It forms notably the link between the personal data stored in an anonymized manner in the first database, the access tokens generated according to the profile files of the users, and the delivered access authorizations. It thereby guarantees by construction (privacy by design) the protection of the personal data.

The blockchain makes it possible to ensure the traceability of the anonymized data (storage of fingerprints), the access rights of the users, the authorizations that are delivered to them and ensures the security of the whole in a distributed manner between all the nodes of the network.

The authorization of an access to the data to the benefit of a user is the result of a verification consensus. Each mining or verification node of the network may in fact execute the smart contract "#Subscribe" with the elements of an access request recorded by a user in the blockchain and verify if the emitted authorization is indeed valid.

Figure 5:
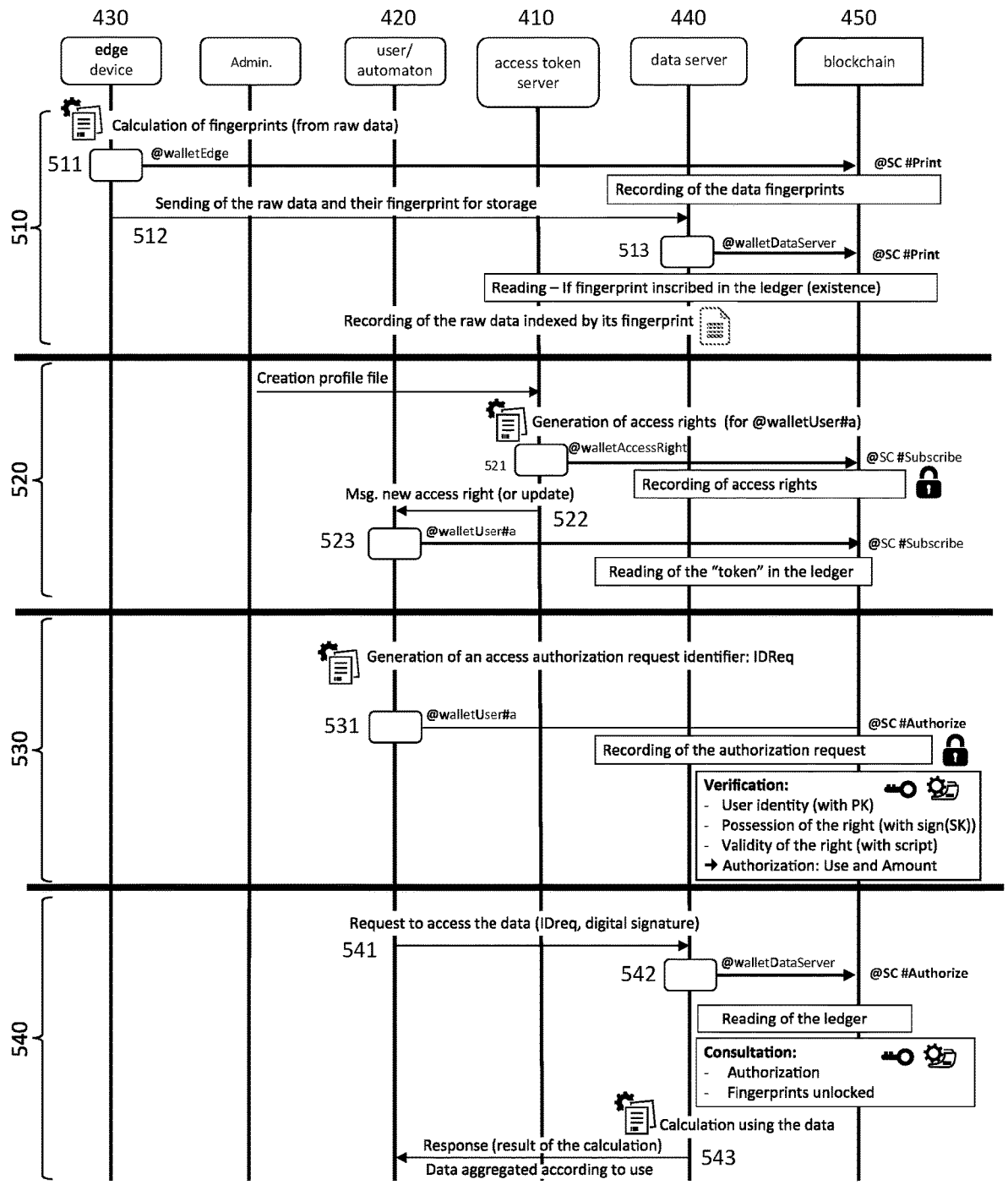
FIG. 5 schematically represents the messages and transactions exchanged in the system of FIG. 4.

FIG. 5 schematically represents the messages and transactions exchanged in the information system of FIG. 4.

Columns have been assigned to the different players of the system of FIG. 5, namely the data generator (edge device), 430, the user (or the automaton), 420, the access token server, 410, the data server, 440, and the blockchain, 450, support for the different smart contracts.

The phase of collecting and recording data is represented in 510. This phase implements the method for anonymizing data such as described in relation with FIG. 2.

The edge device extracts the data from the payloads of the frames and calculates by means of a hash function the fingerprint of these data. To record a data fingerprint in the blockchain, the edge device forms a transaction having for arguments the fingerprint of the data to record and the address of the resource where they are stored (URL of the database or the resource for example) and sends the transaction digitally signed using its private key from its wallet address, @walletEdge.

The signed transaction is transmitted in 511 to the smart contract "#Print" bearing the address @SC #Print in the blockchain. The smart contract authenticates the data emitter (using its public key) by verifying that the wallet address @walletEdge indeed forms part of a list of legitimate edge devices (white list). In the affirmative, the fingerprint is recorded in the blockchain in association with the location of the resource.

In parallel, the edge device transmits in 512 the raw data and their corresponding fingerprint to the data server for storage in the first database at the address of the resource. The data server then places the storage request on standby and consults the distributed ledger from its wallet address, @walletDataServer to verify therein the presence of the fingerprint of the data that it has just received. If the recording of the fingerprint in the blockchain is confirmed, that is to say that the fingerprint is indeed contained in a mined block, attached to the chain, the data server 440 carries out the writing of the raw data in the first database, at an address indexed by the fingerprint of the data in question. More specifically, the data associated with a fingerprint are stored, within the resource, at an address that is supplied in an unequivocal manner by the fingerprint. This makes it possible to find again later the raw data and, if needs be, to verify their integrity.

The phase of collecting and recording data is followed by phases I, II and III of the access method.

Phase 520 corresponds to phase I of FIG. 3, that is to say the generation of access rights (represented by the access tokens) of the different users and their recording in the blockchain.

The access rights are based on access policies indicating what user can access what data under what conditions (context) for which action (purpose, processing of data) and in an optional manner for what amount (price to pay to the different players and in particular to the owner). The generation of access rights is also based on "profile" files pre-recorded in the second database by an administrator. The second database contains the "profile" files for the users, mentioning in particular their role in the system, and the "profile" files for devices authorized to generate data for the information system.

The access token server can generate directly access rights to users (for example if these users are owners of the data which it is wished to access or because their consent is implicit or stems from a legal obligation) or instead request the explicit consent of the owner of the data in question. In the second case, the consent could for example be collected in electronic form by an exchange between the administrator device and the owner of the data via a secure channel. Alternatively, the consent may be recorded with regard to the "token" in the ledger of the blockchain.

The access token server generates for the benefit of a user (here the user #a) or an automaton an access token according to the corresponding profile stored in the second database. It forms a transaction having as argument the access token and signs it digitally with its private key before sending it in 521, from its wallet address, @walletAccessRight, to the address @SC #Subscribe of the contract "#Subscribe", more specifically to the address of the locking script that it contains. This contract records the access token in the blockchain.

Furthermore, the access token server signifies in 522 to the user, by a message or a notification, that new access rights have just been allocated to him.

The user is then able to read, in 523, from his wallet address, @walletUser #a, the token recorded in the distributed ledger of the blockchain.

Phase 530 corresponds to phase II of the access method of FIG. 3. It is here assumed that the preliminary collection phase and the first phase of generating access rights have been carried out beforehand.

In 531, a user can take advantage of the access rights that he possesses (materialised by an access token) to request and, if needs be, obtain an access authorization to personal data.

This access authorization request is attributed an identifier IDreq by the user.

The user #a requests an access authorization using a transaction comprising elements making it possible to verify his identity and his access token. This transaction is emitted in 531 from the wallet address of the user, @walletUser a#, and includes at least as arguments the identifier of the request, IDreq and the identifier of the token, TokUID. After having signed this transaction by means of his private key, the user sends it with the corresponding function to the unlocking script of the smart contract "#Authorize" recorded in the blockchain at the address @SC#Authorize.

When the smart contract "#Authorize" is executed by a node (mining or verification node), the user is identified by means of his wallet address, the unlocking script verifies, using the public key of the user, that the token indeed belongs to the user and that the access token is indeed valid (for example if it is out of date or not). If the verification is positive, the unlocking script supplies an authorization specifying for what use it is granted. By default, the authorization is refused.

When the authorization is granted, the number of the access request, IDreq, is recorded in the blockchain by the verification (or mining) nodes. On the other hand, if the authorization is refused, no recording takes place and the ledger of the blockchain containing the states remains unchanged.

Thus, the authorization in question may easily be verified by all the players interacting with the blockchain. Moreover, if a cost is associated with the granting of this authorization, a transaction representing a transfer of an amount in cryptocurrency may be emitted (for example to the wallet address of the owner of the personal data and/or to that of the access rights administrator device).

Phase 540 corresponds to phase III of the access method of FIG. 3.

This phase includes the actual access to the personal data, the optional processing of these data by the data server and the transmission of the result to the user having requested the access.

The user transmits in 541 to the data server, via the second secure channel (thus outside of the blockchain), an access request having for argument the identifier of the authorization obtained previously, IDreq. This request is signed digitally using the private key of the wallet of the user.

The data server then consults in 542 the blockchain from its wallet address, @walletDataServer, in order to read therein the presence (existence) of the authorization bearing the number IDreq.

The data server verifies that the access authorization has indeed been granted to the user #a for the request IDreq and recovers the access token corresponding to this authorization.

It extracts from the token the identifier of the data source and interrogates the contract #Print to recover the URL of the resource and the data fingerprints.

The data server next reads the personal data stored at the addresses indexed by the data fingerprints, in the resource pointed by the URL.

If needs be, the server carries out a processing of the data thereby read (for example an aggregation of data), the processing being defined by the use appearing in the authorization previously read in the blockchain. The result of the processing is next transmitted in 543 to the user via the second secure channel.

Figure 6:
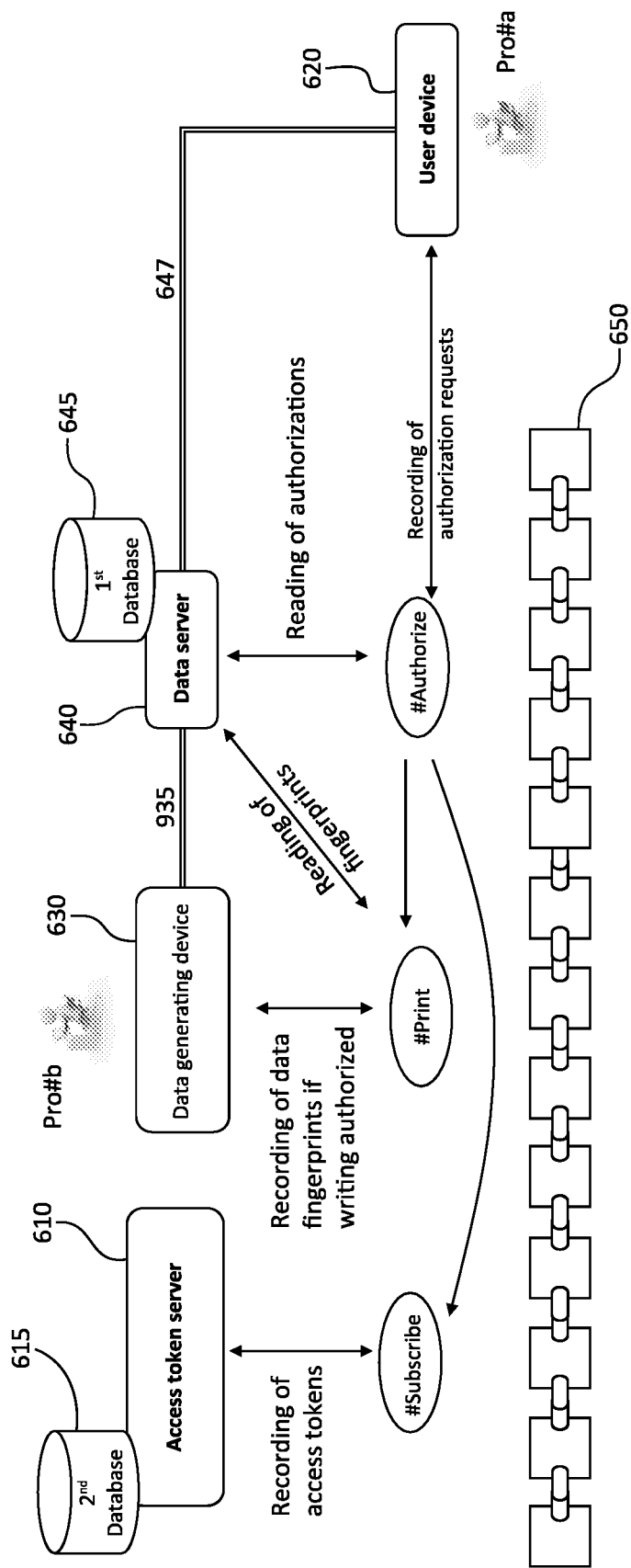
FIG. 6 schematically represents the architecture of a second information system implementing the method for anonymizing personal data according to FIG. 1 and the method for accessing these data according to FIG. 2.

FIG. 6 schematically represents the architecture of a system for managing access to personal data according to a second embodiment of the invention.

Without loss of generality, the second embodiment will be illustrated in a case of use of the management of access to medical data (patient dossier) by health professionals (epidemiologists for example).

In this embodiment, the data do not come from connected objects and collected by an edge device but are generated by a data generating device, 630, such as the terminal of a health professional Pro b# (attending physician, medical analysis laboratory, etc.).

The information system includes a data server 640 hosting a first database 645 in which the unencrypted medical data are stored, each data frame (or data file) being stored at an address indexed by its fingerprint.

The terminal of the practitioner, 630, is connected to data server, 640, by means of a first secure channel, 635. Similarly, a user device, 620, for example the terminal of a health professional wishing to access medical data, is connected to the data server 640 by means of a second secure channel, 647.

Each of the players of the system, namely the user device, the data generator, the data server, includes a BKC interface enabling it to interact with the blockchain 650 from a wallet address.

As in the first embodiment, the interactions of these players with the blockchain calls upon the smart contracts "#Print", "#Subscribe" and "#Authorize" described above.

Figure 7A:
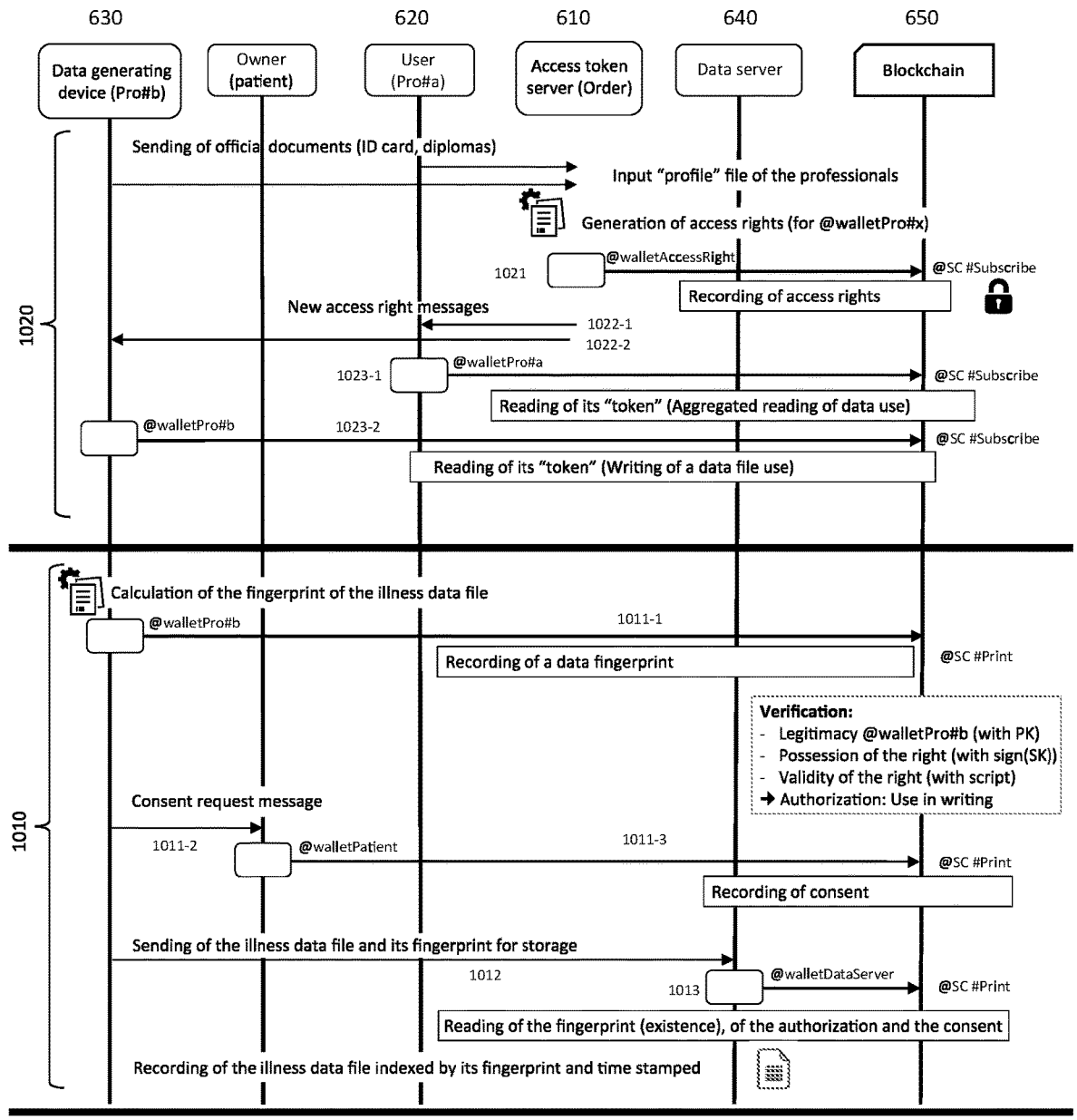
FIGS. 7A and 7B schematically represent the messages and transactions exchanged in the information system of FIG. 6.
Figure 7B:
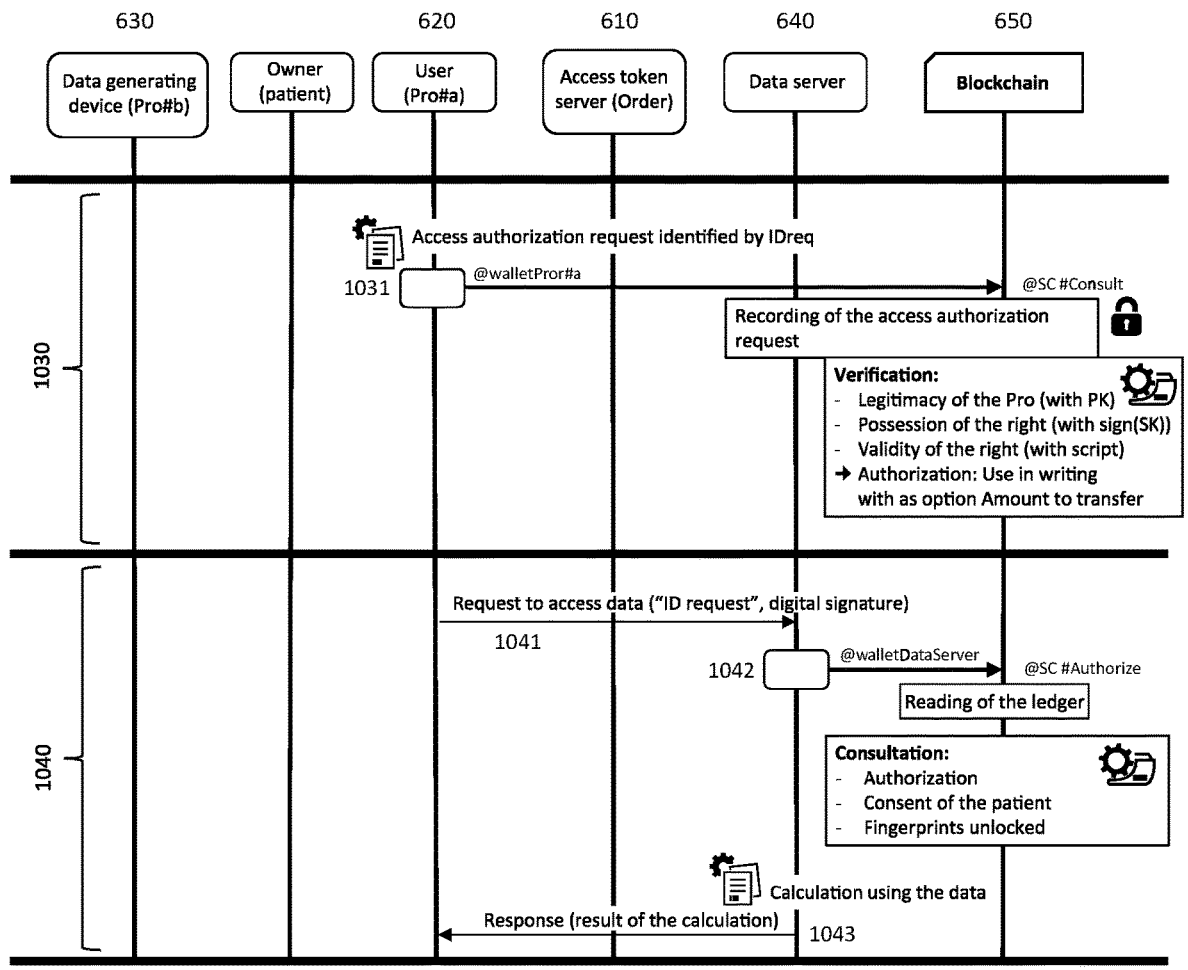

FIGS. 7A and 7B schematically represent the messages and transactions exchanged in the information system of FIG. 6.

In the columns the different players of the information system are represented: the data generator (e.g. terminal of Pro b#, such as that of the attending physician), 630, the terminal of the owner of the medical data (patient), the device user (e.g. terminal of Pro a#), 620, the access rights generator (for example terminal of the Governing Council), 610, the data server, 640, and the blockchain, 650, support for the execution of the smart contracts ("#Print", "#Subscribe" and "#Authorize").

In this second information system, the phase of recording the access rights, 1020, precedes the phase of anonymized recording of the data, 1010. This is necessary here in so far as the access generator (Pro b#) must have obtained beforehand a writing access profile so that the personal data can be recorded in the first database.

In phase 1020, the data generator Pro b# and the user Pro a# transmit to the administrator the elements making it possible to identify them and to verify the authenticity of their qualifications (diploma, professional card, etc.). These elements are input in the form of electronic files, for example.

Once these elements have been verified, the access token server generates for the data generator Pro b# and the user, Pro a#, access tokens (respectively in writing and in reading) from the profiles stored in the second database. For each of them, it forms a transaction emitted from the wallet address of the access rights generating device, @walletAccessRight, comprising the access token, then signs this transaction with its private key before transmitting them in 1021 to the address of the recording function @SC #Subscribe of the contract "#Subscribe".

This contract records the access tokens in the blockchain. The access rights administrator then notifies (in 1022-1 and 1022-2) the data generator Pro b# and the health professional, Pro a#, that they have been granted new access rights. They recover their respective access tokens in 1023-1 and 1023-2 by consulting the ledger at the address of the smart contract "#Subscribe".

In the collecting and recording phase 1010, the data generator Pro b# calculates a data fingerprint (for example the fingerprint of an illness data file) and forms a transaction emitted from its wallet address, @walletPro b#, comprising the fingerprint in question, its location in the form of the URL of the resource for example, and, for example, as access parameter, the identifier of the illness. This transaction is transmitted in 1011 to the blockchain at the address of the recording function @SC #Print of the first smart contract "#Print".

The first smart contract verifies the identity of the data generator Pro b#, and if successful unlocks a writing access authorization then records this authorization in the blockchain.

The data generator furthermore transmits in 1011-2 a consent request to the owner of the data (patient). The terminal of the owner responds by sending in 1011-3 a transaction to the blockchain by calling the first smart contract "#Print". This records the consent of the patient in the block chain.

Moreover, the data generator, Pro b#, transmits in 1012 the data (illness data file) and the corresponding fingerprints to the data server. This verifies the existence of the writing access authorization (of the data generator) and the consent (of the patient) by consulting, in 1023, the first smart contract.

If the verification is conclusive, the server records the data at the addresses indexed by their corresponding fingerprints. Advantageously, the data are time stamped before being stored. As in the preceding embodiment, the data may be stored unencrypted or instead encrypted. In the second case, the data server decrypts them on the go before transmitting them on the second secure channel.

The phase of access authorization request to the data, 1030, assumes that the first and second phases have been executed beforehand.

The user Pro a# (health professional wishing to analyse the data) can request an access authorization to medical data (corresponding to a given illness). This access authorization request is allocated an identifier IDreq by the user.

The user Pro a# requests the (reading) access authorization using a transaction emitted from his wallet address, @walletPro a#, and comprising as arguments the identifier of the authorization request, IDreq, and the identifier of his access token TokUID). After having signed this transaction by means of his private key, the user transmits it in 1031 to the smart contract "#Authorize" recorded in the blockchain at the address @SC #Authorize.

The smart contract "#Authorize" executes an unlocking script delivering an access authorization if the identity of the user (@walletPro a#) is legitimate, if he is indeed the owner of the token identified by TokUID and that the access token is valid. If the verification is conclusive, the unlocking script supplies an access authorization to the resource according to the access policy.

By default, the authorization is refused and nothing is recorded in the blockchain.

As in the first embodiment, the contract is executed by the verification (or mining) nodes of the network which verify the correct behaviour thereof during its execution. In the event of consensus between the verifiers on the result of the execution of the contract, the authorization is recorded in the blockchain.

In the data access phase, 1040, the user transmits in 141 to the data server, via the second secure channel, an access request having for argument the request identifier IDreq.

The data server then consults the blockchain by emitting in 1042, from the wallet address of the data server, @walletDataServer, a transaction comprising the authorization request identifier, IDreq, and the token identifier (TokUID). The data server verifies that the access authorization has indeed been granted to the user @walletPro a# for the request IDreq, that the consent of the owner (patient) of the data is indeed recorded, recovers the address of the contract #Print in the token and reads the fingerprints associated with the data source specified in the access token.

The data server next reads the data stored in the first database at the addresses indexed by the data fingerprints.

If needs be, the server carries out a processing of the data thereby read. For example, it may combine several data coming from different sources. It may also be authorized to process or disclose only a part of the data read (accessed), the processing being defined by the use appearing in the token previously read in the blockchain.

The result of the processing is next transmitted in 1043 to the user Pro a# via the second secure channel.

The invention claimed is:

1. A method for anonymized storage of personal data, said personal data belonging to an owner of data and being supplied by a data generating device, said personal data being intended to be stored in a first database hosted by a data server, the data generating device being connected to the data server with a first secure channel, the data generating device and the data server being interfaced with a blockchain, wherein:
the data generator generates fingerprints of said data with a hash function and records said fingerprints in the blockchain by calling a first smart contract deployed in said chain, said fingerprints being recorded in the blockchain in relation with access parameters;
the data generator transmits said fingerprints and associated data to the data server via the first secure channel;
the data server consults the blockchain to read therein the recorded fingerprints, a datum being stored in the first database at an address indexed by its fingerprint if this fingerprint is recorded in the blockchain, and not being stored in the first database if this fingerprint is not recorded in the blockchain.

2. The method for anonymized storage of personal data according to claim 1, wherein the data are stored unencrypted in the first database.

3. The method for anonymized storage of personal data according to claim 1, wherein the data generating device is an edge device of a network of sensors, the edge device collecting raw data coming from these sensors via a gateway.

4. The method for anonymized storage of personal data according to claim 3, wherein said data are collected in the form of frames, each frame associated with a sensor comprising a header containing the identifier of the sensor and a payload containing the raw data of the sensor, the fingerprint of the raw data being stored in the blockchain in relation with said identifier of the sensor.

5. The method for managing access to personal data including an anonymized storage of these data according to claim 1, wherein:
(a) an access token server generates access tokens for different users, an access token of a user representing the access rights of this user to the personal data for a predetermined use, the access token of said user being identified by a token identifier and transmitted, with a second transaction, to a second smart contract stored in the blockchain, the second smart contract recording the access token in the blockchain;
(b) a terminal of said user transmits, with a third transaction, an access authorization request identified by an authorization request identifier, to a third smart contract stored in the blockchain, the third smart contract interrogating the first smart contract and obtaining the access token by supplying to it cryptographic elements making it possible to authenticate the user, then determining if the access conditions contained in the token are indeed met and, in the affirmative, recording the access authorization in the blockchain;
(c) the terminal of said user transmits an access request to the data server, the access request including said access authorization request identifier, the data server interrogating the third smart contract by supplying to it said access authorization request identifier, the third smart contract returning to the data server the token corresponding to this request if an access authorization corresponding to the authorization request identifier is indeed recorded in the blockchain;
(d) the data server reads in the blockchain the fingerprints corresponding to the access parameters specified in the access token obtained at step (c), reads the personal data stored in the first database at the addresses indexed by the fingerprints thereby read, and transmits the personal data thereby read to the terminal of said user.

6. The method for managing access to personal data according to claim 5, wherein said access parameters include the identifier of a sensor.

7. The method for managing access to personal data according to claim 5, wherein the cryptographic elements include a public key of the user and a wallet address obtained by hashing of said public key.

8. The method for managing access to personal data according to claim 5, wherein, prior to step (b), the token identifier is transmitted to the terminal of the user.

9. The method for managing access to personal data according to claim 5, wherein at step (b) the access authorization request is recorded in the blockchain.

10. The method for managing access to personal data according to claim 5, wherein the access token has a first field containing the token identifier, a second field containing an identifier of the user, a third optional field containing an identifier of the owner of the personal data, a fourth optional field containing the address of the first contract, and a fifth field containing the access parameters.

* * * * *